W. SMOLLEY.
CORN HUSKING MACHINE.
APPLICATION FILED APR. 22, 1916.
1,317,736.
Patented Oct. 7, 1919.
3 SHEETS—SHEET 1.
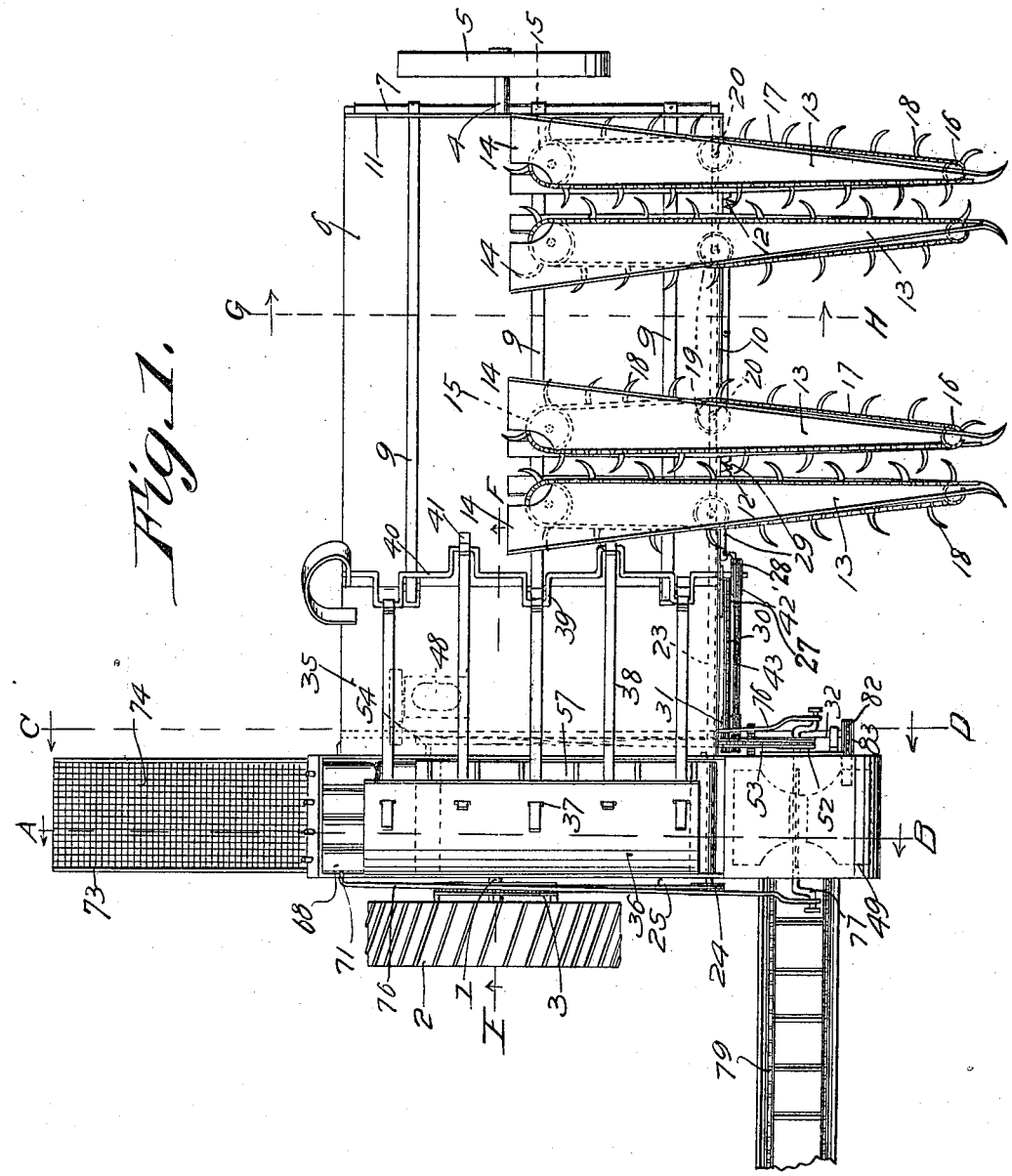
Witnesses
Wayne Smolley,
Inventor
by C.A. Snow & Co.
Attorneys

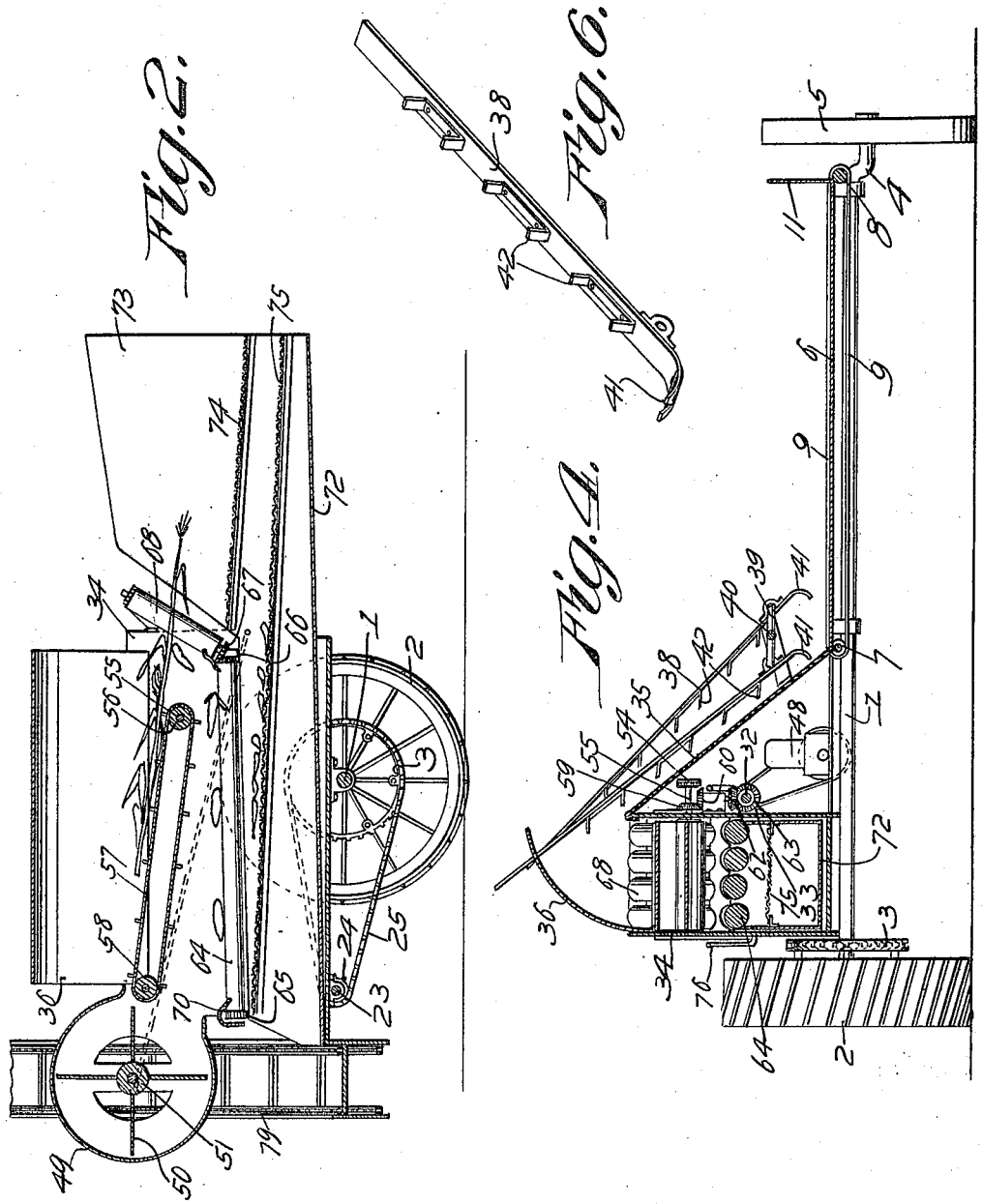

W. SMOLLEY.
CORN HUSKING MACHINE.
APPLICATION FILED APR. 22, 1916.
1,317,736.
Patented Oct. 7, 1919.
3 SHEETS—SHEET 3.
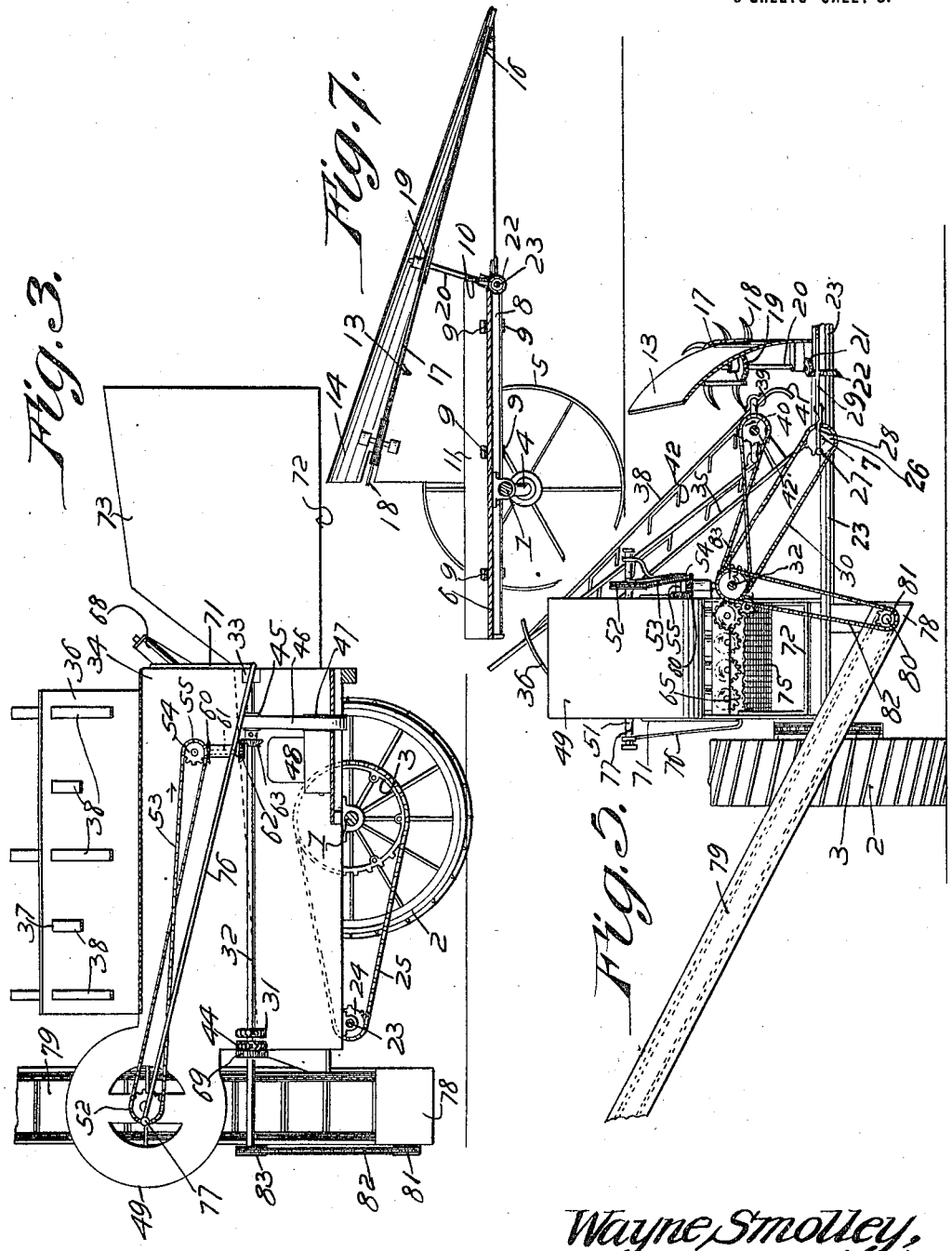
Witnesses
Wayne Smolley,
Inventor
by C. A. Snow & Co.
Attorneys

UNITED STATES PATENT OFFICE.

WAYNE SMOLLEY, OF BROOKVILLE, INDIANA.

CORN-HUSKING MACHINE.

1,317,736.     Specification of Letters Patent.     Patented Oct. 7, 1919.

Application filed April 22, 1916. Serial No. 92,930.

*To all whom it may concern:*

Be it known that I, WAYNE SMOLLEY, a citizen of the United States, residing at Brookville, in the county of Franklin and State of Indiana, have invented a new and useful Corn-Husking Machine, of which the following is a specification.

This invention relates to machines for harvesting corn, one object being to provide a machine which will gather the severed stalks and convey them to mechanism which will remove the ears from the stalks, this mechanism discharging the stalks rearwardly from the machine while the ears are directed onto husking rolls.

A further object is to provide means whereby the husked ears and any loose corn separated therefrom will be collected within an elevator and thus directed to a wagon or other receptacle provided therefor.

A further object is to provide a machine of this character which is compact in construction and, which will operate smoothly and continuously.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a plan view of the machine.

Fig. 2 is a section on line A—B Fig. 1.

Fig. 3 is a section on line C—D Fig. 1.

Fig. 4 is a section on line E—F Fig. 1.

Fig. 5 is a front elevation of one side portion of the machine.

Fig. 6 is a perspective view of one of the conveyer bars, the same being inverted.

Fig. 7 is a section on line G—H Fig. 1.

Referring to the figures by characters of reference 1 designates a supporting axle upon one end of which is arranged a main supporting wheel 2 to which is secured a large drive sprocket 3. The other end of the axle is preferably offset downwardly as at 4 and engages a supporting wheel 5.

Supported by the axle and extending close to the wheel 5 is a platform 6 at the sides of which are provided longitudinal shafts 7 carrying rolls 8 on which are mounted conveyer belts 9 extending over and under the platform. Upstanding from the front of the platform is a wall 10 and another wall 11 extends upwardly from the outer side of the platform. Wall 10 is provided in the present instance with two receiving openings 12 from the sides of each of which extend forwardly diverging gathering members 13 having rearwardly extending wings 14 which overhang the front portion of the platform. Journaled under the rear portion of the wings 14 are sprockets 15 and additional sprockets 16 are journaled under the top portions of the gathering members 13. Each pair of sprockets is engaged by an endless gathering chain 17 having outstanding teeth or fingers 18. These teeth are adapted to project into the space between the gathering members and to move rearwardly within said space during the forward movement of the machine, thus to engage stalks and direct them positively onto the platform 6 after they have been severed. Each chain 17 receives motion from a sprocket 19 secured to an upstanding shaft 20. The two shafts 20 adjacent each pair of gathering members 13 are provided with bevel gears 21 at their lower ends which mesh with bevel gears 22 secured to a shaft 23 extending along the front portion of the platform 6. This shaft extends beyond the inner side of the platform and is provided with a sprocket 24 receiving motion through a chain 25 from the sprocket 3. Thus it will be seen that as the machine moves forwardly motion will be transmitted to the gathering chain from the wheel 2 and the movement of the chain can thus be timed with the forward movement of the machine.

The shaft 7 farthest from the wheel 5 has a sprocket 26 secured to its front end portion and this sprocket is provided with a wrist pin 27 engaged by a pitman 28. This pitman is adapted to drive a sickle bar 29 which works in front of the platform 6 and across the bottoms of the openings 12 so as to sever stalks as they come close to the platform 6. Reciprocation of the sickle bar is effected by the rapid rotation of the sprocket 26, as will be obvious, this sprocket being driven through a chain 30, from a sprocket 31 secured to a longitudinal shaft 32.

The shaft 32 is journaled in brackets 33 extending laterally from a housing 34 mounted above that portion of the axle 1 near the wheel 2, the top of the housing being open and there being an incline 35 leading upwardly to the inner side of this housing from the inner side of the platform 6. An arcuate deflecting shield 36 extends upwardly and inwardly from the outer side of the housing and has a series of openings 37 for the reception of conveyer bars 38. These bars are mounted to reciprocate within the respective openings and are mounted near their lower ends upon cranks 39 carried by a shaft 40 located above the inner side of platform 6. The lower ends of the bars 38 are downturned as at 41 and extending from the lower face of each bar are teeth 42 preferably substantially horizontal. The cranks 39 are so arranged that during the rotation of shaft 40 the bars 38 will be reciprocated above the incline 35, one set of bars moving upwardly while another set is moving downwardly. During the downward movement of a bar its crank will hold it lifted away from the incline 35 so as thus to clear any material engaged by the upwardly moving bars.

Shaft 40 has a sprocket 42' at one end which receives motion through a chain 43, from a sprocket 44 on shaft 32.

Shaft 32 has a pulley 45 designed to receive motion through a belt 46 from a pulley 47 driven by a motor 48 which is mounted at any suitable point upon the machine, preferably close to the inner side of the housing 34 near the back thereof.

Arranged in front of the upper portion of the housing 34 is a fan casing 49 designed to discharge air rearwardly within the upper portion of the housing and within this casing is a fan 50 the shaft 51 of which has a sprocket 52 receiving motion through a chain 53 from a sprocket 54 secured to one end of a shaft 55. This shaft is extended transversely through the rear portion of the housing 34 and carries a roller 56 on which is mounted an endless apron 57. This apron is also mounted upon a roller 58 located within the upper portion of the outlet of the fan casing 49. Thus the apron is inclined downwardly and rearwardly within the housing and air discharged from the casing 49 is directed under the apron. Shaft 55 has a bevel gear 59 which receives motion through a bevel gear 60 from a shaft 61 which, in turn, receives motion through gears 62 and 63 from the shaft 32.

Arranged under the apron 57 and inclined downwardly and forwardly are husking rolls 64 provided at their front ends with meshing gears 65 so that they will be positively actuated. The rear ends of the husking rolls have bevel gears 66 meshing with bevel gears 67 provided at the lower ends of upwardly and rearwardly inclined snapping rollers 68 which are located within the upper portion of the rear end of the housing 34 and in the path of any material discharged rearwardly from the apron 57. The train or gears 65 is actuated by a gear 69 on shaft 32. As the husking rolls 64 are inclined downwardly and forwardly, it will be apparent that any ears supported thereby will be discharged forwardly over a guard plate 70 extending over the gears 65.

Hangers 71 extend downwardly from the rear portion of the housing 34 and pivotally engage a shoe 72 in the form of an elongated trough, the bottom of this shoe being inclined downwardly and forwardly and the front end portion being slidably mounted on the bottom of the housing 34. The shoe is open at the top and both ends and the front portion of the shoe is extended under the husking rolls 64 while the rear portion of the shoe has its walls extending upwardly so as to project above the snapping rolls 68, as shown at 73. Mounted within the rear portion of the shoe is a downwardly and rearwardly inclined screen 74 the forward upper end of which is arranged close to the lower ends of the snapping rolls 68. Another downwardly and rearwardly inclined screen 75 is arranged under screen 74 and under the husking rolls 64 and this screen 75 extends rearwardly from the front ends of the husking rolls and to the rear end of the shoe. The bottom of the shoe constitutes an incline for directing shelled corn forwardly so that it will be discharged from the front end of the shoe. A pitman 76 is connected to each side of the shoe and the two pitmen are mounted on and actuated by crank arms 77 provided at the end of the fan shaft 51. Thus it will be apparent that during the rotation of shaft 51 and the actuation of the fan 50, a very rapid reciprocation of the shoe 72 will be effected.

Arranged in front of and below the housing 34 is a boot 78 designed to receive the husked ears from the rolls 64 and the shelled corn from the incline 72. An upwardly and laterally inclined endless elevator 79 extends from this boot and is driven by a shaft 80 having a sprocket 81 receiving motion through a chain 82 from a sprocket 83 on the shaft 32.

As hereinbefore pointed out when the machine is moved forwardly motion will be transmitted from the wheel 2 to the gathering chain 17 and those teeth on the chain extending into the opening between the gathering members 13 will move rearwardly at the same speed that the machine is moving forwardly. Consequently the stalks received between the gathering members 13 will be kept upstanding while being cut by the rapidly reciprocating sickle bar 29. The severed stalks will be directed rearwardly and will fall onto the belt 9 with their tops supported above the rear portion of the platform 6. Belt 9 will be driven by the mechanism hereinbefore described and will convey the stalks sidewise until they are brought within reach of the bars 38. These bars will carry the stalks upwardly and deposit them in the upper portion of the housing 34 where they will rest on the endless apron 57 and be carried rearwardly by said apron. The tops of the stalks will be fed into engagement with the snapping rolls 68 and these rolls, which receive their motion from rolls 64 will remove ears from the stalks and discharge the stalks rearwardly onto the screen 74 and thence out of the machine. The ears which are thus separated from the stalks will drop onto the husking rolls 64. These rolls will remove the husks and discharge them onto the screen 75. Any shelled corn loosened in the husking operation will fall through screen 75 and onto the incline 72 and will be discharged from the front end of the machine together with the ears and discharge into the boot 78. The material thus discharged will be carried upwardly by the conveyor and delivered to a wagon at one side of the machine. The fan will direct a current of air rearwardly within the housing 34 so as to facilitate separation of the corn from the silk, husks, etc., and, because of the rapid reciprocation of the shoe 72, the material discharged thereinto will be quickly moved in the desired direction so that there will be no danger of the apparatus becoming clogged. While a portion of the mechanism has been described and shown driven by a motor, while the remaining portion of the mechanism is driven by the wheel 2, it is to be understood that all of the mechanism can be driven by the motor or any portion thereof as desired.

Importance is attached to the fact that the ears are removed from the stalks after the stalks have been severed and that the snapping and husking operation is all carried on practically at one point so that all loss of ears or grain such as has heretofore been occasioned by the snapping of ears from the standing stalks, is eliminated. Importance is also attached to the particular means for feeding the stalks to the snapping rolls whereby the ears are directed onto the husking rolls and the stalks are discharged from the machine.

What is claimed is:—

A corn snapping and husking machine consisting of means for depositing stalks lengthwise, a conveyer upon which said stalks are deposited in the same direction lengthwise transversely of said conveyer, elevating means for raising said stalks without changing the direction in which they extend, conveying means for conveying said stalks lengthwise, snapping rolls through which said stalks are conveyed lengthwise, and husking means extending lengthwise and below the last named conveyer and snapping rolls, the stalks being maintained in the same direction without turning throughout the whole operation of the different parts of the machine.

In testimony that I claim the foregoing as my own I have hereto affixed my signature in the presence of two witnesses.

WAYNE SMOLLEY.

Witnesses:
R. A. YOUNG,
J. F. ENNIS.

Copies of this patent may be obtained for five cents each, by addressing the "Commissioner of Patents, Washington, D. C."